United States Patent [19]

Erikson et al.

[11] 4,122,457

[45] Oct. 24, 1978

[54] INK JET PRINTER WITH DEFLECTED NOZZLES

[75] Inventors: Rolf B. Erikson, Lincolnwood; Edward H. Zemke, Chicago; Kenneth L. Guenther, Park Ridge, all of Ill.

[73] Assignee: Bell & Howell Company, Chicago, Ill.

[21] Appl. No.: 722,899

[22] Filed: Sep. 13, 1976

[51] Int. Cl.[2] .............................................. G01D 15/18

[52] U.S. Cl. .......................................... 346/75; 64/19; 101/366; 271/99; 271/166; 271/274; 346/134; 346/140 R

[58] Field of Search ..................... 346/75, 140 R, 134; 271/132, 99, 134, 166, 274; 74/63; 64/13, 12, 19; 226/176; 197/1 R; 101/366

[56] References Cited

U.S. PATENT DOCUMENTS

| | | | |
|---|---|---|---|
| 3,503,606 | 3/1970 | Castellanet | 271/166 |
| 3,737,914 | 6/1973 | Hertz | 346/75 |
| 3,791,170 | 2/1974 | Schmidt | 64/19 |
| 3,852,772 | 12/1974 | Hecht | 346/75 |
| 3,930,258 | 12/1975 | Dick | 346/75 |
| 3,973,768 | 8/1976 | Shannon | 271/99 |
| 4,027,142 | 5/1977 | Paup | 346/75 X |

OTHER PUBLICATIONS

Hertz et al.; Electric Control of Fluid Jets & Its Application to Recording Devices; Rev. of Sci. Ins.; vol. 43, No. 3, Mar. 1972, pp. 413-416.

Ernbo, A; Application of Intensity-Modulated Ink Jets to Alphanumeric Printing Devices; IREE Trans. on Computers, vol. C-21, No. 9, Sep. 1972, pp. 942-947.

*Primary Examiner*—Joseph W. Hartary
*Attorney, Agent, or Firm*—Harry G. Thibault; Alan B. Samlan

[57] ABSTRACT

The inventive ink jet printing system is driven from a repertoire data storage medium such as perforated tape or cards, magnetic tape or cards, or the like, on which the stored data may be changed, updated, increased or decreased, or deleted in whole or in part. The data read from this storage medium is fed into a microprocessor which directs a ganged multiplicity of ink jet printing heads, to simultaneously printout a plurality of lines of type. A transport mechanism picks up and feeds paper, magazines, or the like through a printing station where the ganged ink jets print out responsive to the data supplied from the repertoire storage medium. A number of housekeeping functions are carried out simultaneously, to insure that ink is delivered to and collected from the nozzles of the printing heads.

26 Claims, 26 Drawing Figures

INK JET PRINTER WITH DEFLECTED NOZZLES

This invention relates to ink jet printers and more particularly to high speed repertoire printers.

As here used, the term "repertoire" implies that a plurality of information or data items are more or less permanently stored for future read out. When read out occurs, alphanumerical symbols are printed in a prescribed format, responsive to those information or data items. The data in the repertoire storage may be changed, updated, increased or deleted, in whole or in part, at anytime. For convenience of illustration, the information or data items are herein described as names and addresses printed on mailing labels. For example, these could be the mailing labels on magazines, envelopes, or the like. However, this reference to "repertoire" or "labels" is not a limitation upon the scope of the invention.

The inventive device may use an ink jet printer head, of any suitable design. In particular, the jet printer technology here used was pioneered by Hellmuth Hertz. Some of this technology is disclosed in Mr. Hertz's following U.S. Pat. Nos. 3,416,153; 3,673,601; and 3,737,914. The technology is also described in a doctoral thesis entitled "Ink Jet Printing with Mechanically Deflected Jet Nozzles" by Rolf Erikson for the Department of Electrical Measurements, Lund Institute of Technology, Lund, Sweden. The specific jet printer head used in one embodiment, actually built and tested, is a galvanometer (Part No. 60 72 235 E039E) made by Siemens — Elema AB of Stockholm, Sweden.

The galvanometer has a mechanically oscillated ink jet nozzle which traces a cyclically repetitive path above a moving paper or other media. In a preferred form, the "cyclically repetitive" path may be a sine wave; however, other geometric wave forms may also be used. The ink jet nozzle has an output stream of ink droplets which can be modulated or controlled responsive to electrical signals generated by a microprocessor. The jet stream is modulated by a selective diversion of an ink jet stream responsive to an electrical field applied near the nozzle. Attention is paid to oscillation of the nozzle, printing rate and paper quality, and the density and sharpness of the desired printing. The result is a printing of alphanumerical or other characters, at a rate which is in the order of 250 characters per second per nozzle.

The ink jet is transformed by the galvanometer into a stream of fine droplets which follow each other, single file toward a medium, such as paper, magazine, or the like. If a charged electrode is placed near the point of droplet formation, each drop carrys an electrical charge. Since all droplet charges are the same, there is a strong repulsion between the adjacent drops which break up the jet, a few millimeters from the point of drop formation. Another electrode is placed in the ink in the nozzle; therefore, by controlling the voltage difference between the electrode near the point of drop formation and the electrode in the ink, the ink jet can be switched or deflected between the two paths resulting in an on-off modulation of a trace formed by the droplets striking the paper.

The jet nozzle may be mechanically deflected, simultaneously with a modulation which occurs when the ink jet is switched on or off. Therefore, by using mechanical deflection of the nozzle together with a simultaneous electrical modulation of the ink jet drops, any desired form of graphic characters may be printed. Since the jet nozzle may oscillate at frequencies in the order of 2 kHz and since the upper frequency limit of the intensity modulation is higher than 100 kHz, this method of printing has many applications, especially in high speed printing. Also, the jet spray may fall upon almost any surface, regardless of its texture.

Therefore, there is little need to maintain an adequate backing or to otherwise hold the paper in such a rigid or firm position that a type face may strike the paper squarely. Accordingly, labels may be printed directly onto magazines, newspapers, or the like. There is no need to print on a paper label which is thereafter glued upon the magazine, newspaper or the like. Thus, there is a flexibility wherein printing may be applied to almost anything.

This flexibility creates a new problem of stacking, transporting and otherwise handling the media. For example, the thickness of any one magazine may vary substantially as compared to the thickness of another supposedly "identical" magazine. Also, the folded side of the magazine is generally thicker than the unfolded side. At another time, the same printer may be called upon to print upon single sheets of thin paper, for example. Here, the transporation characteristics of the thin paper media are opposite to the transportation characteristics of a magazine. The magazine is bulky, and the overall thickness is difficult to precisely control. The paper is thin, with closely controlled thickness. The magazine is hard to pick up and transport since its pages tend to separate; the paper is hard to pick up since individual sheets tend to stick together. Hence, the media transport mechanism for such a flexible printer tends to have conflicting demands placed upon it.

Accordingly, an object of the invention is to provide new and improved ink jet printing machines. Here, an object is to provide a simplified, trouble-free jet printing which avoids problems that have been encountered heretofore. In particular, an object is to avoid many of the problems heretofore associated with a deflective jet stream to form alphanumerical characters responsive solely to complex electronic modulation. Conversely stated, an object is to reduce to a minimum the need for uniformity of droplet size and charge.

Another object is to provide new and novel means for and methods of forming characters by use of an ink jet technique. Here an object is to provide for mechanical deflection of the ink jet nozzle and electrical on/off modulation of the jet stream from such nozzle. In this connection, an object is to avoid problems incident to the need for maintaining precise electrical charges upon the droplets of a jet stream. Another object is to provide means for and methods of managing of the supply of ink to the nozzle and the disposal of excess ink from the nozzle.

Still another object is to provide new and novel means for and methods of selecting, manipulating and transporting a great variety of media having vastly different physical characteristics. In this connection, an object is to handle media ranging from thin sheets of paper to bulky magazines. Here an object is to eliminate a need for media having either uniform or closely controlled physical characteristics.

Yet another object of this invention is to provide electronic circuitry for controlling ink jet printing devices. Here an object is to provide ink jet printers which may be operated responsive to a repertoire of stored information.

A special object of this invention is to provide a total system for addressing, sorting, and correlating bulk mailing pieces.

In keeping with an aspect of the invention, an ink jet printer is driven responsive to a bulk data storage medium such as tape or cards, or the like. A repertoire of data is read off this storage medium and fed into a microprocessor which controls a ganged multiplicity of ink jet heads, to simultaneously printout a plurality of lines. A transport mechanism picks up and transports the media under the ganged jet heads. A number of housekeeping functions are also carried out to insure that an adequate supply of ink is delivered to and collected from the jet nozzles.

The nature of a preferred embodiment of the invention may be understood from a study of the attached drawings, wherein.

Figure 1:
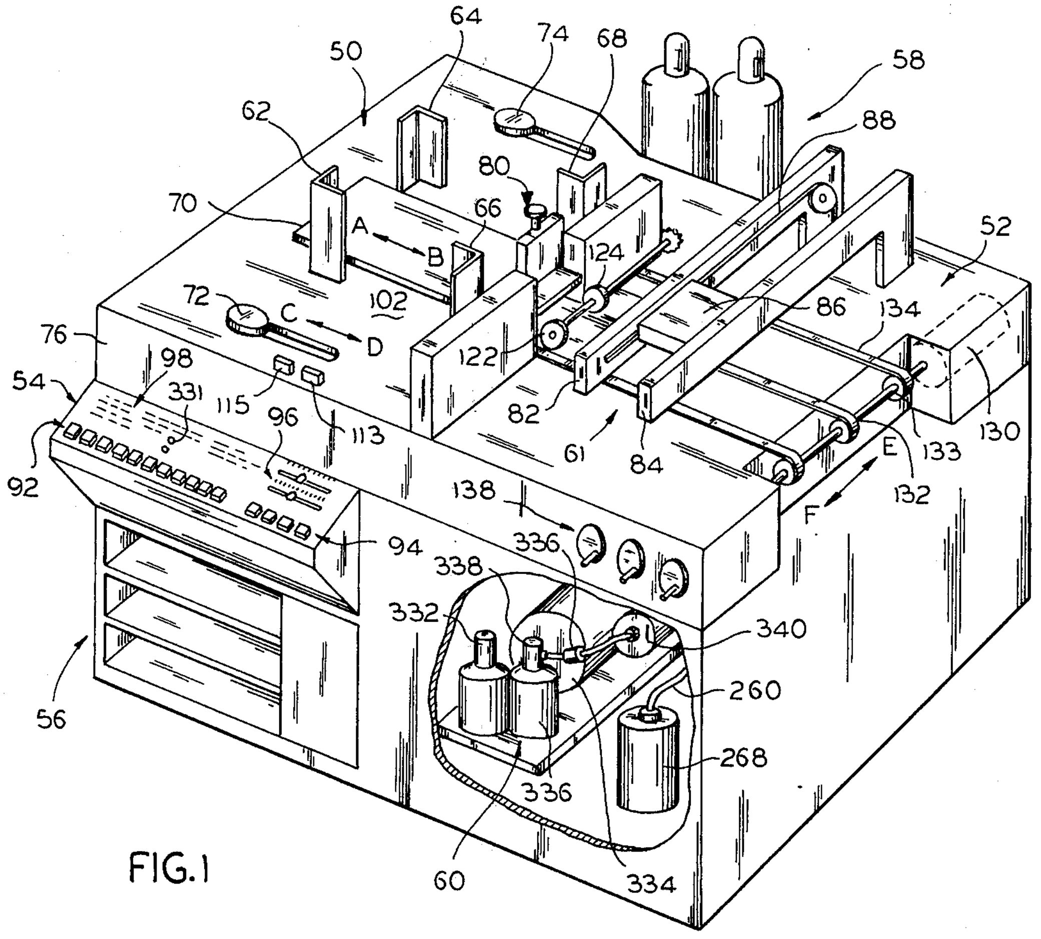
FIG. 1 is a perspective view of the front of the inventive ink jet printer.
Figure 5:
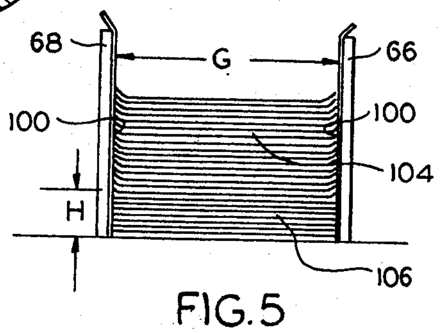
Figure 6:
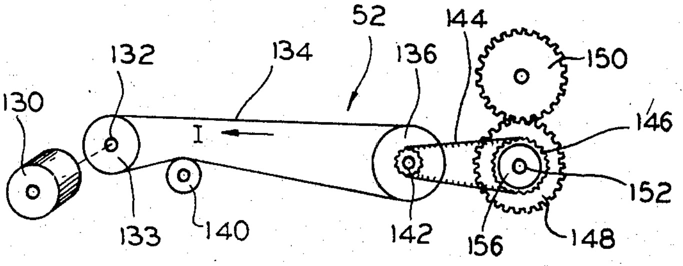
Figure 7:
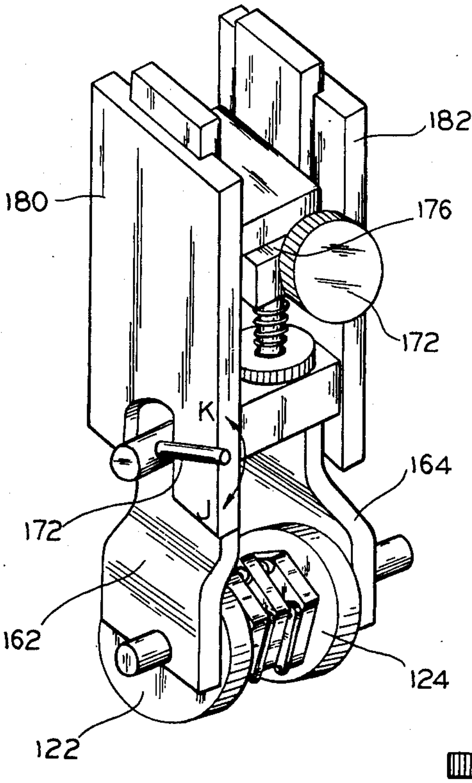
Figure 7B:
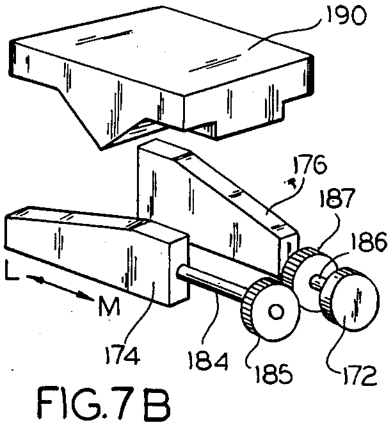
Figure 7A:
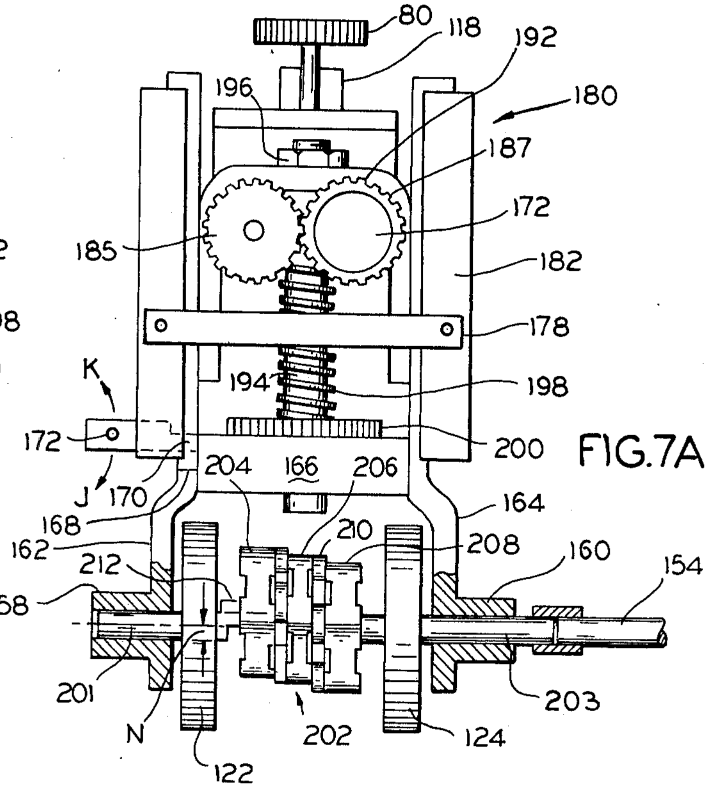
Figure 8:
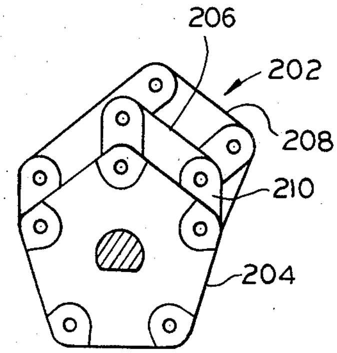
Figure 9:
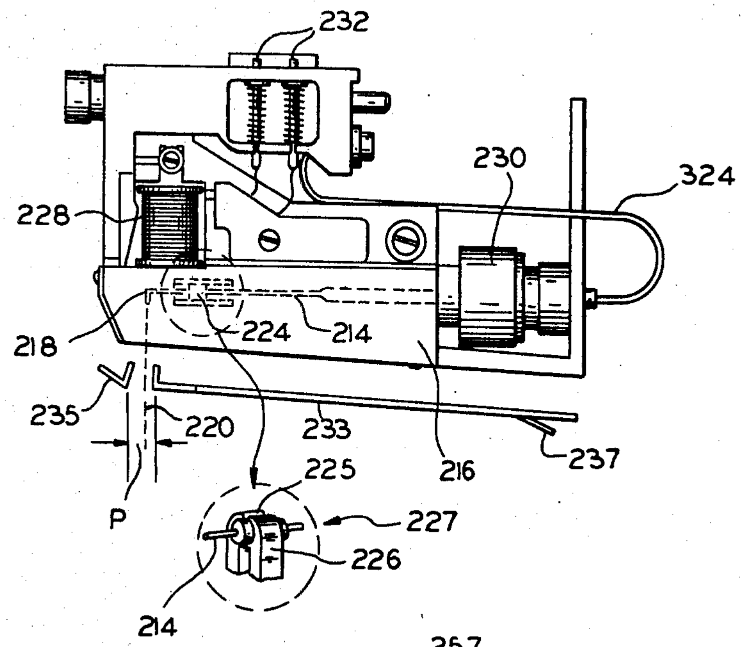
Figure 10:
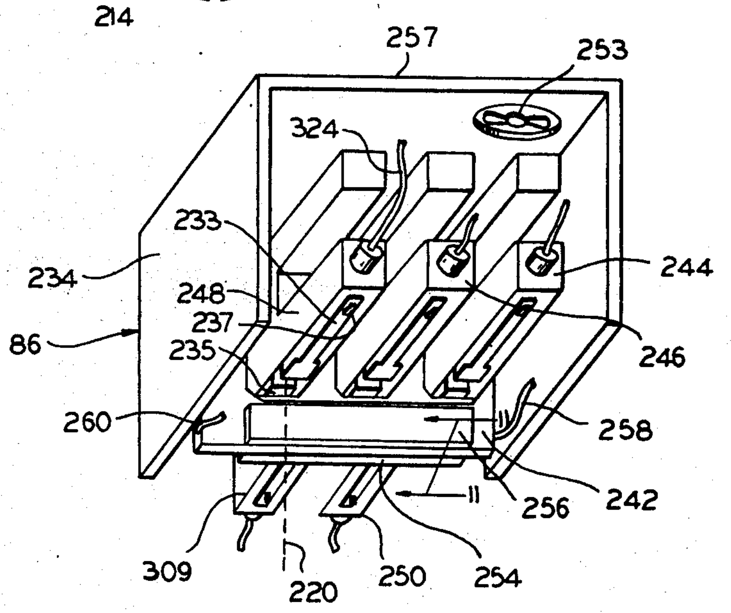
Figure 11:
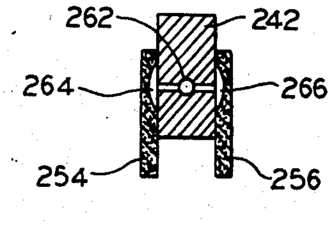
Figure 12:
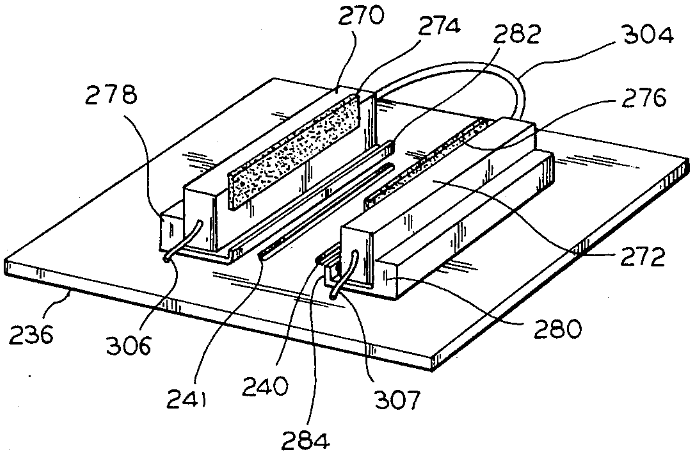
Figure 13:
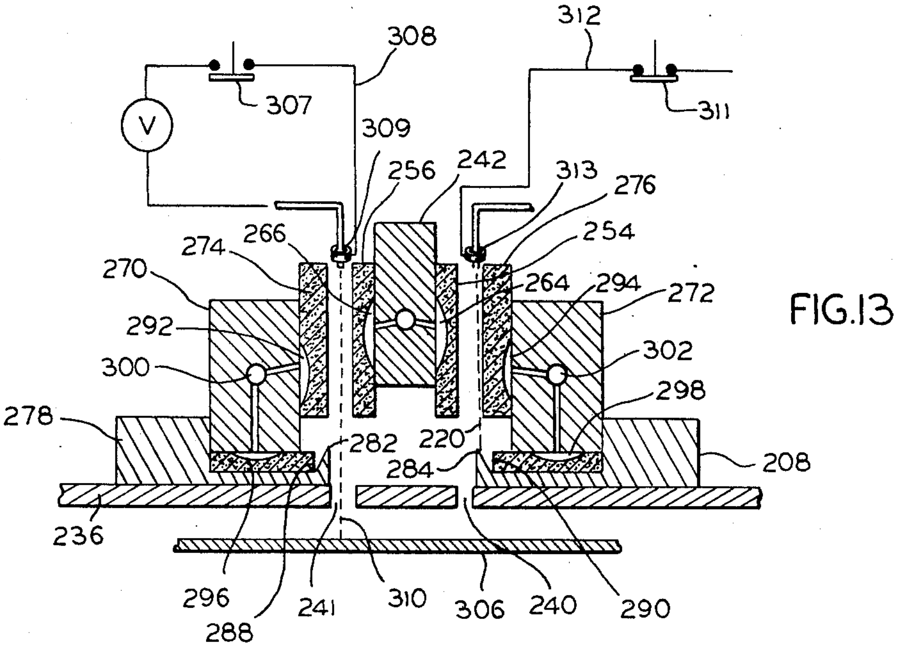
Figure 13A:
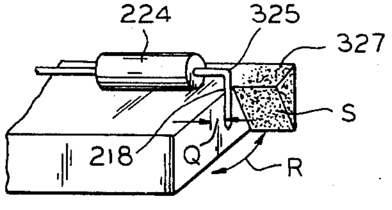
Figure 13B:
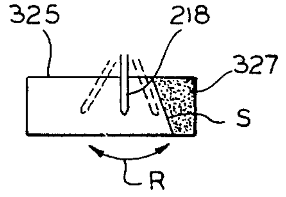
Figure 14:
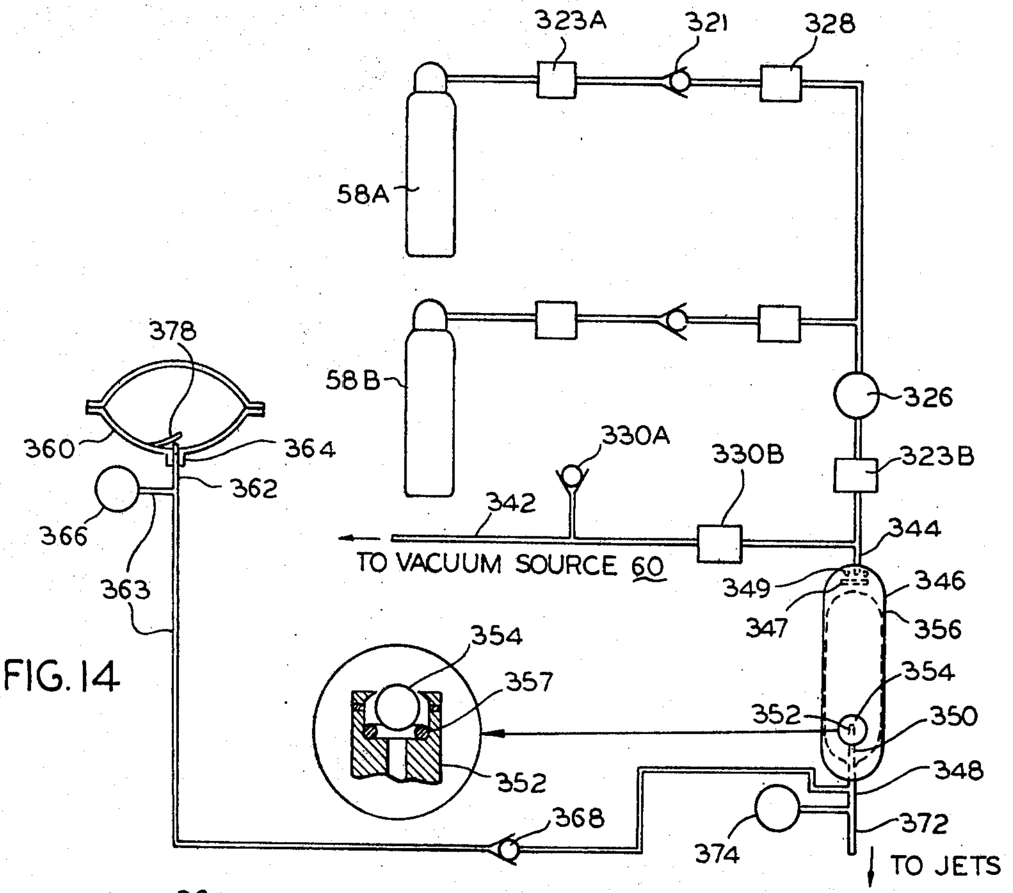
Figure 15:
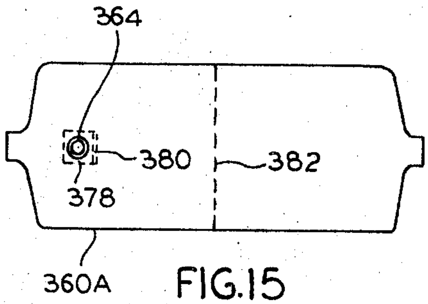
Figure 20:
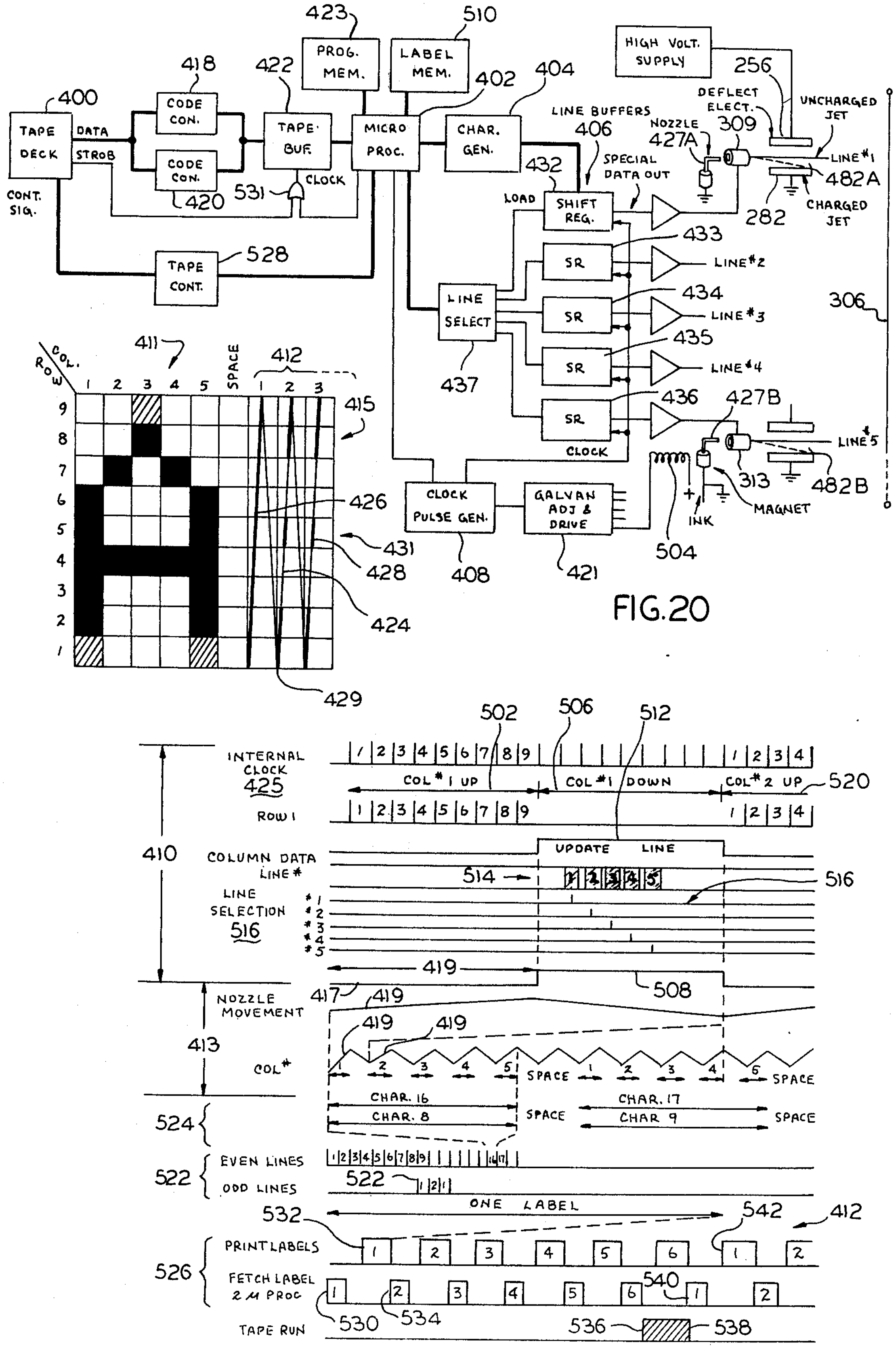
Figure 21:
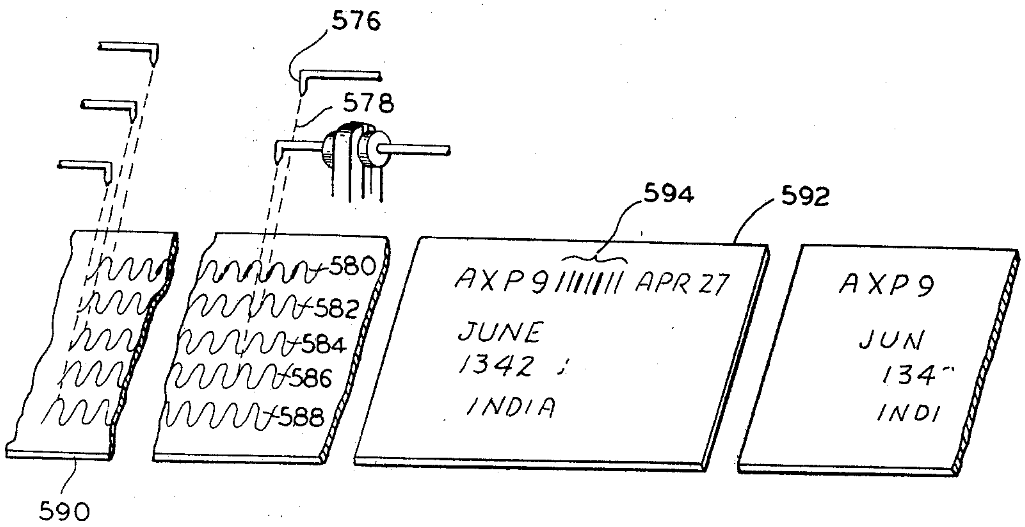
Figure 22:
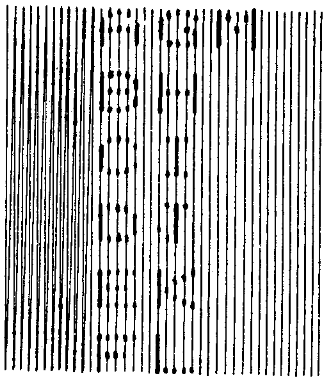

FIG. 5 graphically explains how a stack of media is automatically fanned to introduce air between adjacent layers or sheets, to facilitate pickup;

FIG. 6 is a schematic representation of the media transport mechanism;

FIG. 7 is a perspective view of a nip roller support and height adjustment mechanism, adapted to work with media having a non-uniform thickness;

FIG. 7A is a front elevation view of the mechanism of FIG. 7;

FIG. 7B is a perspective view of the elevator used in the mechanism of FIG. 7;

FIG. 8 is a perspective view of a coupling for driving the nip rollers of FIG. 7 despite a non-alignment of the nip roller axles;

FIG. 9 is a side elevation of the galvanometer used to oscillate the ink jet;

FIG. 10 is a perspective view of a printing head and part of its housing, the head featuring a plurality of the galvanometers of FIG. 9, ganged to simultaneously print a number of lines;

FIG. 11 is a cross section of a pair of electrodes and their support, taken along line 11—11 of FIG. 10;

FIG. 12 is a perspective view of the top of the housing of FIG. 10 and of a pair of grounding electrodes and surplus ink collectors, used in conjunction with the printing head;

FIG. 13 is a cross-sectional view of the electrode structures which are provided when the top of FIG. 12 is placed on the housing of FIG. 11;

FIG. 13A is a fragmentary perspective view of the jet nozzle and porous electrode which illustrates how the jet nozzle may be deflected to remove a drop formed thereon;

FIG. 13B is a plan view of the jet nozzle and electrode of FIG. 13A;

FIG. 14 is a schematic representation of an ink management system used in the inventive printer;

FIGS. 15–19 are a series of sketches showing how an inventive ink cartridge is made for use in the ink management system of FIG. 14;

FIG. 20 is a block diagram of an electronic control system for driving and controlling the inventive printer;

FIG. 21 schematically illustrates the method of ink jet printing, which occurs when the electronic control of circuit of FIG. 20 drives the printer of FIG. 1; and FIG. 22 schematically shows how a single jet may be used to simultaneously print a plurality of lines at a time.

GENERAL DESCRIPTION

Figure 2:
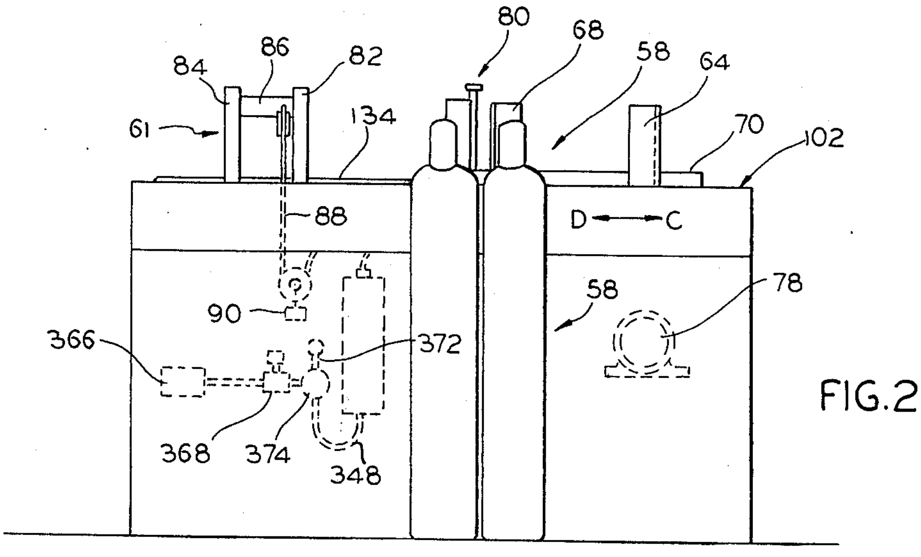
FIG. 2 is a rear elevation of the inventive printer.

The major assemblies in the inventive printer (FIGS. 1, 2) are media select and transport mechanisms, 50, 52, a control panel 54, electronic controls 56, a source 58 of ink pressure, an ink scavengering system 60, and an ink jet printing station 61. Any suitable covers (not shown) may be provided to enclose and protect both the structure of the printer and the people working around it.

The media select mechanism 50 comprises a plurality of upright guide posts 62, 64, 66, 68 mounted on the table of the printer and near a reciprocally moving shuttle 70. The guide posts 62, 64 may be moved back and forth in directions A, B by loosening, moving and then tightening a pair of knobs 72, 74. This adjusts the distances between the posts 62, 64 and 66, 68 to fit the dimensions of the media (not shown). In a similar manner, the width spacing between the guide posts may also be adjusted by any suitable means (not shown).

The shuttle plate 70 is mounted on tracks attached to the table, for reciprocal shuttle movement in direction C, D responsive to motive power supplied by a motor 78 (FIG. 2) mounted in the rear, left-hand portion of the printer housing, as viewed in FIG. 1. As the shuttle 70 moves in direction D, a single media (e.g., a single magazine) is picked up and fed through a gate means 80 and into the transport system 52. Alphanumerical characters are printed on the media as it passes under the ink jet printing station 61.

The printing station 61 comprises a pair of rails or arms 82, 84 extending transversely over the transport mechanism 52. A printing head 86 is mounted on these rails 82, 84 to move back and forth in direction E, F. Conveniently, a worker simply pushes the head 86 in one of the two directions E, F, until it stands over a desired printing station. The ink and electrical connections to the printing head 61 are made via a cable 88, which is preferably weighted at 90 (FIG. 2) within the cabinet so that there is no slack cable.

Figure 3:
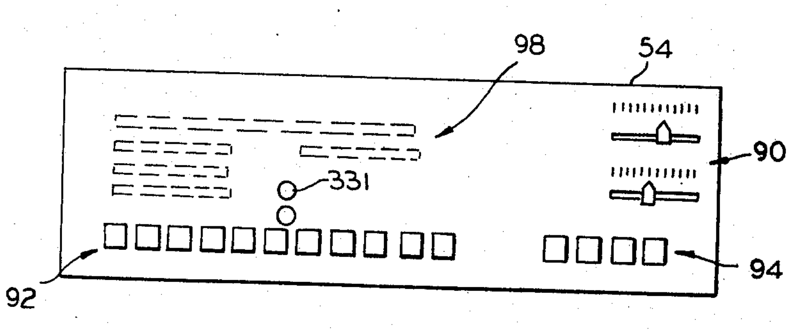
FIG. 3 is a layout of the control panel of the printer, which helps explain its functions and control.

The operation of the ink jet printer is controlled by push buttons and slide bars on the control panel 54, which is shown in detail in FIG. 3. More particularly, there are two groups of push buttons 92, 94, a pair of slide bars 96, and a number of selectively lit signs 98. The push buttons 92 command the printer functions, such as: power on/off, print, test, reverse print, zip code sort, zip code print, back space, and tape code. The "print" push button causes the printer to print from left-to-right; if the switch "test" is pressed, the printer will output a standard test message which may be used for adjustments of the printer; the "reverse print" enables the printer to print upside down and from right-to-left (the control computer merely reverses the normal character order while the media moves in an opposite-to-normal direction). The "zip code sort" push button causes the printer to recognize each new zip code, as it appears, so that media may be diverted into suitable groups which are thereby sorted according to the zip code. Normally, the machine recognizes any changes in zip code and signals these events. However, when the switch "zip code sort" is pressed, the machine provides two different outputs, depending upon whether the code change occurred in the two last digits or the first three. If the "zip code print" push button is operated, a suitable symbol or symbols may be added to the last (or first) label in each new zip code, to facilitate a mechanical reader to detect and sort according to zip code changes, at some future time. The "back space" push button causes the repertoire storage unit to back space and again read out a previously read block of data. The "tape code" push button enables the printer to accept different code formats. It is presently thought that most of the codes will be in ASCII (a copy of which is found in FIG. 1 of U.S. Pat. No. 3,386,553). However, other codes are also used and this push button adapts the printer to accept them.

The selectively lit signs 98 inform the operator if the printer encounters any problems. For example, these signs may say such things as "low ink", "replace gas supply", or the like. Therefore, an operator observing the lit signs may either service the printer or operate the push buttons in an appropriate manner. Of course, these signs may also be color coded to indicate the urgency of the action required.

The push buttons 94 enable a repairman to perform housekeeping functions. A push button marked "safe" may be pushed so that the machine cannot operate in any manner which might injure a person who is then working on the machine. Another push button marked "jog" causes the machine to make very small, step-at-a-time movements so that the interaction of all parts may be observed. The other two push buttons start or stop the machine.

The slide bars 96 enable analog adjustments. For example, they may select any appropriate distance between the edge of a label area and the first character printed in that area. Or they may adjust a feed rate to accommodate the differences caused by different lengths of magazines or paper, for example. The belt motor drives at a constant; therefore, a shorter document can be fed at a higher rate.

MEDIA PICKUP GATE AND FANNING MEANS

Figure 4:
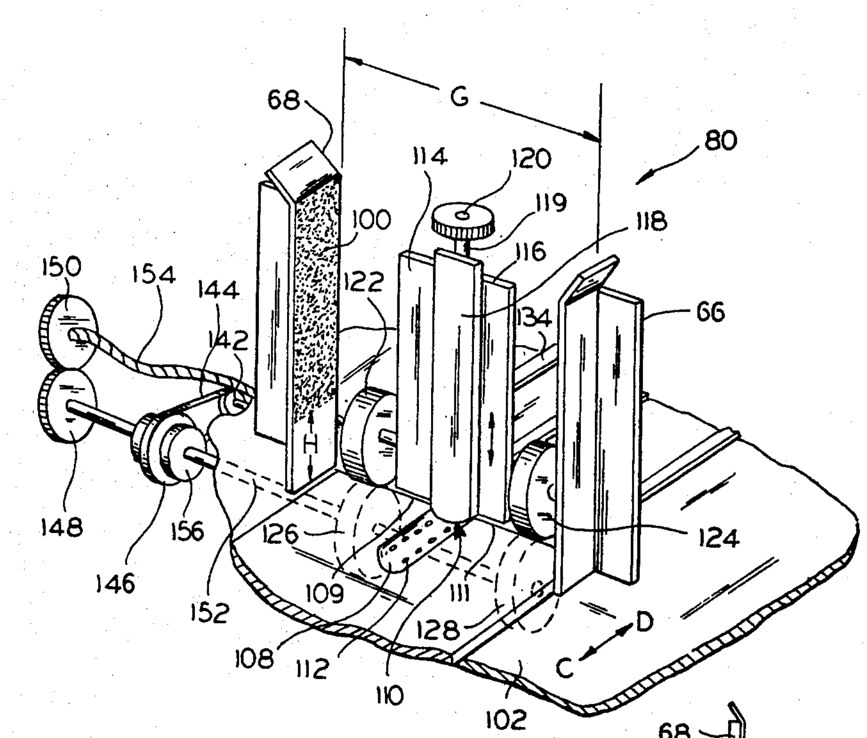
FIG. 4 is a perspective view of a media pickup means and gate device.

FIG. 4 illustrates the gate 80 used to enable the printer to pick up individual sheets and to fan the media. The gate is able to accommodate such diverse media as paper, magazines, or other media, which are picked up one at a time and delivered to the printing heads.

In greater detail, the two upstanding paper guides 66, 68 are set apart a predetermined distance, which coincides with the width of the paper or media. The inside surfaces of the guides 62, 64, 66, 68 are lined with upstanding bristles of a textured, fiberous material, which lining terminates a distance H above the table level 102. The fibers project toward the media, outwardly and perpendicularly away from the side walls of the guides 62–68. Therefore, when a supply 104 of paper or other media (FIG. 5) is stacked between the upright guides 62, 64, 66, 68, the fiberous material 100 on each of the guides projects far enough into the space G to cause the paper to bow upwardly at the edges. The individual fibers act as many small fingers to riffle the individual pages of the paper. Therefore, the paper is fanned to introduce air between the individual sheets. Below the level H, the individual sheets lie flat upon table 102, as at 106, ready to be fed into a pick-up gate. In this flat region, enough air has been introduced between the individual sheets to facilitate the pickup.

A shallow depression, dish, or trough 108 is formed in the shuttle table, immediately in front of the pickup gate 110. The bottom of trough 108 is lined with vacuum holes 112 which suck the bottom sheet of the media down into the trough. A pair of stationary, upright, spaced, parallel rails 114, 116 are positioned to rise on either side of trough 108. For course gate adjustments, these guide rails may be moved up or down by any convenient distance to provide clearance spaces 109, 111 which is just wide enough to allow one media to pass therethrough. Vertically sliding between rails 114, 116 is a gate member 118 which may be finely adjusted to any convenient height by means of a knob 120 connected to a feed screw 119. The nut (not shown) for the feed screw is attached to the back of gate 118. Thus, the side rails 114, 116 may be placed at a coursely adjusted position to fix the spaces 109, 111. Then, the fine adjustment gate 118 may be raised or lowered until the space 110 becomes exactly the distance required to pass only a single paper, magazine, or other media, when it is sucked down into trough 108.

NIP ROLLERS, TRANSPORT, DRIVE, AND SUPPORT

A pair of nip rollers 112-128 are mounted on opposite sides of the vertical gate rails 114, 116. The upper nip roller 122 or 124, in each pair, is above the table 102 level and the mating lower nip rollers 126, 128 are below the table level. The nip of the rollers is horizontally opposite the gate 109–111, and spaced apart by a distance somewhat less than the thickness of the media then passing through the jet ink printing machine. This way, the shuttle 70 reciprocally moves back and forth in directions C, D. Each time that it moves in directin D, a paper, magazine or other media is pulled down by the vacuum in trough 108 and pushed through gate 118. As this is done, the paper, magazine or other media is caught in the nip between the nip rollers 122–128 and propelled toward a number of conveyor belts. The supply of air to vacuum shoe 108 is controlled by an electrical valve. The switching of the valve is done by means of two optical interrupters, the position of which can be adjusted by knobs 113, 115. At a certain position during the back stroke in direction C, determined by switch 115, the valve connects a vacuum source to shoe 108, to enable a catching of the material during the forward stroke D at a point determined by switch 113, the valve switches again and connects some air pressure from the pressure side of the vacuum pump to push the paper off the shoe 108.

The nip rollers must be independently adjustable, in a vertical direction to accommodate a folded paper, a magazine, or other media of uncontrolled thickness. For example, if the folded side of a magazine is on the right (as viewed in FIG. 4), the nip roller 124 must move upwardly further than the nip roller 122 moves because the fold makes that side thicker than the other or open side. Moreover, it may be necessary for both rollers to jiggle up or down as the magazine passes between them since some individual magazines are randomly thicker than other magazines in the same printing run.

There are other problems since nip rollers having different diameters also have different linear speeds, at the peripheries of their tires. If uncorrected, the upper and lower rollers would tend to skuff or abrade the media as it passes between them. If a multisheet media (such as a magazine) is passing between the nip rollers, any skuffing would tend to peel back some pages, which would probably jam in gate 110. Accordingly, the nip roller, transport, drive, and support assembly is adapted to overcome all of these and similar problems.

FIG. 6 shows the power train for driving the transport mechanism 52. The primary motive source is a motor 130 coupled to drive a shaft 132 having a number of pulley wheels (such as 133) mounted thereon, to turn therewith. Trained over each pully wheel is an endless belt (such as 134) which runs in direction I. As belts 134 run, they turn a roller 136 located near the output of the nip rollers 122–128. (The individual belts may be moved toward or away from each other, by manipulation of handles 138 (FIG. 1) which control the spacing between the pulleys on shaft 132. Idler 140 (FIG. 6) adjusts belt tension.)

A pulley wheel 142 at the end of roller 136 turns with it, as it is rotated by the endless belts. A belt 144 transmits the power of the turning roller 136 from pulley wheel 142 to a mating pulley wheel 146. To prevent slippage, both of the pulleys 142, 146 may have upstanding teeth and belt 144 may have mating involute teeth. The pulley 146 is coupled to a first gear 148 beneath table level 102 meshing with a second gear 150 above the table. The gear 148 turns a shaft 152 mounted under table 102 for rotating the lower nip rollers 126, 128. The gear 150 is connected through a Bowden cable 154 to drive the upper nip rollers 122, 124. Since the Bowden cable is flexible, the upper nip rollers are free to be moved up and down without regard to axle alignment.

One in each mated pair of the nip rollers has a diameter which is larger than the diameter of the other mating roller. For example, each of the lower nip rollers 126, 128 may be a little larger than each of the upper nip rollers 122, 124. Thus, the linear speed at the tire periphery of the lower nip rollers is always slightly faster than the corresponding linear speed of the other nip roller.

A differential 156 may be interposed between the power trains driving the upper and lower nip rollers. Pulley 146 may be integral with the housing of the differential. Accordingly, both upper and lower nip rollers may be driven from the same source. When the slower of the nip rollers falls behind the faster, the differential 156 enables the nip rollers to turn at different speeds and thereby prevent skuffing the media or peeling back the pages of a magazine. When the slower of the nip rollers catches up, it is positively driven via the involute toothed belt 144 and the associated two pulley wheels 142, 146. This way, both the upper and lower nip rollers 122–128 may be positively driven and still may experience totally different driving conditions without damaging the media in any way.

The nip rollers may be moved up or down, independently of each other. Usually, this movement is made as part of the initial set up for any given printing run. Thereafter, it is not necessary to reset them until the physical characteristics of the media change. In greater detail, the two upper nip rollers 122, 124 are independently mounted in bearings 158, 160 upon plates 162, 164 on opposite sides of the gate 118. Each of these plates is suitably mounted for individual up or down motions, to form individually adjustable yoke members. One of the yoke members 164 has a horizontal support 166 firmly attached thereto, as by welding, bolting, or the like. The other yoke member 162 is separate from support 166. However, a stud 168 integrally formed on support 166 projects horizontally into an opposing cavity in yoke member 162. An eccentric cam 170 is horizontally mounted on the side of yoke 162 opposite the cavity and controlled by a lever 172. When lever 172 swings upwardly in direction K, the associated eccentric cam 170 moves to loosen the stud 168. Then, the nip roller support yoke members 162, 164 may be moved up or down relative to each other. Thereafter, the lever 172 is swung downwardly in direction J, and the eccentric cam 170 locks against stud 168 on the horizontal support member 166. The two yoke members 162, 164 are then locked together.

This way the vertical spacing between the two mated pairs of nip rollers 122, 126 and 124, 128 may be adjusted independently. Therefore, a magazine, for example, feeds smoothly between the nip rollers even though the folded edge is much thicker than the opposite edge.

A knob 172 may be turned in order to adjust the vertical disposition of the yoke members 162, 164 after they have been independently adjusted and locked together. As best seen in FIG. 7B, there are two spaced parallel, vertical plates 174, 176, each having an upper inclined plane and a threaded hole extending horizontally through it. These planes are able to slide back and forth in directions L, M, on a shelf 178, which is part of the ground assembly 180, 182 that supports the yoke members 162, 164. Each of the inclined plane plates 174, 176, has an associated threaded feed screw 184, 186 which extends through the horizontal hole in the plate. Knob 172 is attached to the end of one of these feed screws. A pair of meshing gears 185, 187 are mounted on feed screws 184, 186. Therefore, as knob 172 rotates one way, feed screws 184, 186 turn in one set of directions and the inclined plane plates 174, 176 approach each other and as knob 172 rotates the other way, the plates move apart.

A follower 190 rides on the two inclined planes of plates 174, 176. As the inclined planes on the plates approach each other, the follower 190 moves upwardly (as viewed in FIG. 7B). As the planes move apart, the follower 190 moves down. The vertical position of the yoke 162, 163 is controlled by the follower. Therefore, after the yoke members are locked together by cam 170, they may be raised or lowered to place the upper nip rollers 122, 124 precise distances from the lower nip rollers 126, 128.

In order to accommodate minor variations in thickness between individual magazines in the same printing run, the follower 190 rests on a spring loaded plate 192 (FIG. 7A) connected between yoke members 162, 164. A bolt 194 passes upwardly from horizontal support member 166, through the entire elevation control assembly to the plate 192. A nut 196 on the end of bolt 194 abuts against plate 192 and limits vertical motion of the upper nip rollers 122, 124.

Coaxial with bolt 194 is a coiled spring 198 which extends between the support member 166 and the upper plate 192, in order to urge the nip rollers 122, 124 downwardly. Beneath the spring 195 is a thumb wheel 200 for adjusting the spring tension. When the forces urging the nip rollers apart exceeds the spring tension, upper nip rollers 122, 124 may move upwardly in order to provide strain relief.

Means are provided for transmitting rotary driving forces between the two upper nip rollers despite misalignment of their axles, owing to the independent vertical adjustments of the individual rollers. It should be apparent that the rotary power transmitted to the upper nip rollers 122, 124 creates a problem since the two bearings 158, 160 may or may not be aligned. Therefore, an eccentric drive coupling 202 (FIG. 8) is connected between the axles 201, 203 of the two nip rollers. In one embodiment, this coupler is Part No. 1E1 15-14-6 made by Schmidt Couplings Inc. of 4298 East Galbraith Road, Cincinnati, Ohio. However, there is a problem that a Schmidt coupler is not normally able to interconnect two axles having co-axial alignment, and it is quite possible that axles 201, 203 will be aligned on many occasions.

In general, a Schmidt coupler comprises three similarly shaped and sized pentagonal plates 204, 206, 208 mounted in a spaced parallel arrangement. Ten individual, elongated arms (as at 210) are pivotally interconnected at each of their ends to the corresponding apexes of adjoining plates 204, 206, 208. For example, the lower end of arm 210 is pivotally connected to plate 204 and the upper end is pivotally connected to plate 206. Axle 201 of nip roller 122 is clamped to the left-hand pentagonal plate 204, and axle 203 is clamped to the right-hand pentagonal plate 208. The center pentagonal plate 206 is pivotally connected to both of the outer plates 204, 208 via arms 210. The end 212 of axle 201 has an eccentric or crank arm. This means axle 201 may assume any vertical position (aligned or non-aligned) relative to axle 202, and yet the Schmidt coupling may still interconnect two non-aligned axles 201, 203, which the Schmidt coupling must do in order to transfer rotary power between outer plates 204, 208. The throw distance N of the eccentric or crank arm 212 is equal to or greater than the minimum amount of axle misalignment required by the Schmidt coupling.

INK JET PRINTER

After the paper, magazine or other media has passed out of the nip rollers, it is carried by the running belts (such as 134, FIG. 1) past the printing station 61. The details of the printing head 86 are shown in FIGS. 9–13.

The Siemens-Elema galvanometer (Part No. 60 72 235 E039E) is seen in FIG. 9. In greater detail, characters can be printed with a single intensity modulated ink jet, if the direction of that ink jet is mechanically changed in an oscillatory fashion to follow a cyclically repetitive path, such as a sine wave, for example. The oscillatory movement is most conveniently obtained by mechanically oscillating the nozzle producing the ink jet. The quality obtained by the ink jet technology is dependent on the writing speed, (i.e., the speed at which the paper moves and at which the ink is traced on the paper). For the best results this writing speed should be in the range of 3–12 m/s.

If the cyclically repetitive path is a sine wave traced over a paper, the oscillating jet nozzle has a writing speed $v_s$ given by:

$$v_s = A_w/2 \times coswt$$

where: A is the width of the scan and $w$ is the oscillating frequency.
From this equation, for practical, usable widths A, an upper frequency limit of about 1.5 kHz is sufficient for oscillating the ink jet nozzle, if a sine wave is used as a driving force. However, it should be understood that other suitable oscillation shapes may also be used, but a larger bandwidth may be required.

The ink jet producing part of the galvanometer (FIG. 9) comprises a very thin glass tube 214 with an outer diameter of abut 100 μm, fix mounted at one end in the galvanometer housing 216. The other end 218 of the glass tube 214 is bent at approximately 90° and narrows to a nozzle for producing a jet. A stream 220 of droplets flows from this jet 218 toward the paper or media. Co-axially mounted on the tube 214 is a small, cylindrical permanent magnet 224, polarized along its diameter. The magnet 224 is situated between a pair of pole pieces 225, 226 (shown in detail at 227) of an electromagnet 228. The magnetic field turns the magnet with a galvanometer action and thereby deflects the nozzle 218. The restoring moment of the magnetic and nozzle system is caused by the torsion of the glass tube as it twists responsive to energization of coil 228. The ink entering and passing through the glass rod 214 is filtered at 230. Spring loaded contacts 232 enable the galvanometer assembly to be snapped into or taken from the printer.

A pair of electrodes 233, 235 are mounted on the bottom of the galvanometer to form a gap P, through which the ink jet stream 220 passes. A solder terminal or lug 237 is formed on the opposite end of the electrode 233. Therefore, a wire may be connected from the electrode 233 to the microprocessor so that the ink jet stream 220 may be modulated with an electrical charge. Unlike most ink jet printers, the jet stream is uncharged when printing and charged when not printing. This way there is a simple on/off action, and closely controlled analog currents are not required.

The printing head 86 (FIG. 10) includes a plurality of galvanometers, each similar to the one seen in FIG. 9. Each one of these galvanometers prints a separate line of characters on the label.

The printing head 86 comprises a six-sided, outer metal housing 234 which completely encloses all galvanometers and protects persons using the equipment from high electrode voltages. FIG. 10 includes the top and two end panels of the housing. The two side panels of housing 234 are removed in FIG. 10 so that the parts may be seen, and the top housing panel 236, is seen in FIG. 12. Three ink jet streams (such as 220) pass from galvanometers 244, 246, 248 through slot 240 (FIG. 12) when the top is in place. Two other ink jet streams from galvanometers 250, 252, on the far side of the housing 234, pass through slot 241.

Centrally located within the cabinet 234 is an insulating plate 242, which preferably is made of any suitable plastic material. A plurality of high voltage electrodes 254, 256 are suspended from opposite sides of the insulating plate 242. Five galvanometers are supported from the top plate 257 (5 galvanometers are provided since this number is sufficient to simultaneously print five lines of characters forming: a name, a three-line address, and any suitable code, such as the expiration date or account number of a magazine subscription, for example). As should be apparent from a study of FIG. 10, the five galvanometers 244–252 are at staggered locations on opposite sides of the central panel 242. This makes a more compact structure.

Alternatively, a single jet may sweep over the entire width of a label area and simultaneously print any suitable number of lines. Thus, five jets are here shown only to speed the printing process. Hence, any suitable number of jets may print any suitable number of lines.

An electric fan 253 is provided to drive filtered air into the housing to create slightly higher than atmospheric pressure therein. Hence, any foreign substances near the jet nozzles of the galvanometers are blown out of — and not sucked into — the housing. Also, this arrangement enables the entire housing to be well grounded so that workers do not encounter the high voltages on electrodes in the housing.

Two porous electrodes 254, 256 are mounted on the opposite sides of the central insulating plate 242. These electrodes extend adjacent the full length of the printing slots required for the five galvanometers 244–252. Therefore, the ink jet streams from each of the five galvanometers must pass adjacent these electrodes 254, 256 before they reach the slots 240, 241. A high voltage electrical wire 258 is connected through a passageway in central insulating plate 242 to electrodes 254, 256, in order to apply a high potential to them.

A vacuum line 260 is connected through a passageway 262 (FIG. 11) in insulating plate 242 to cavities 264, 266 behind the electrodes 254, 256. Therefore, any ink falling upon the electrodes 254, 256 is sucked through the porous electrode material, into the cavities 264, 266, out passageway 262 and vacuum line 260 to the spent ink scavanging tank 268 (FIG. 1).

The bottom 236 (FIG. 12) of housing 234 includes two more blocks 270, 272, having mounted thereon two more porous electrodes 274, 276, which are held at ground potential. Blocks 270, 272, and insulating plate 242 are held in a spaced parallel relationship (FIG. 13) when the bottom 236 is fixed in place on the housing 234. A gutter member 278, 280 is formed between each of blocks 270, 272 and bottom panel 236. Each of the gutter members terminates in an upstanding razor-sharp edge 282, 284 running closely adjacent the slots 240, 241 through which the five ink jet streams pass.

A pair of porous blocks 288, 290 are interposed between the blocks 270, 272 and the gutter members 278, 280, respectively, with the edges of blocks 288, 290 running closely adjacent to and along the length of the razor-sharp edges 282, 284. A vacuum cavity 292, 294 is formed in each of the porous electrodes 274, 276 and similar cavities 296, 298 are formed in each of the porous blocks 288, 290. Each of these cavities is in communication with a vacuum channel 300, 302 in the blocks 270, 272. Therefore, any ink reaching the electrodes 274, 276, porous blocks 288, 290, or gutters 282, 284 is drawing off through the porous material and into the vacuum system. Vacuum tubes 304, 306, 307 connect the vacuum channels 300, 302 to the spend ink scavenging tank 268 (FIG. 1).

The operation of the ink jet stream modulation is illustrated in FIG. 13. (The term "jet stream" is intended to cover either a stream or a spray, in any suitable form.) Normally, the ink droplets are uncharged during printing so that they pass through the slots 240, 241 to the paper 306. Thus, for example, FIG. 13 shows switch 307 open so that wire 308 and jet stream modulating electrode 309 (FIGS. 10, 13) are deenergized. Therefore, the adjacent ink jet stream 310, modulated by unenergized electrode 309 is shown in FIG. 13 as reaching the paper 306. However, the switch 311 is closed so that wire 312 and electrode 313 (FIGS. 10, 13 are energized) to impart an electrostatic charge to each droplet in the ink jet stream 220.

When an electrostatic charge is imparted to the droplets of ink jet stream or spray 220, the potential on electrode 254 repells and the ground potential on electrode 276 attracts the ink, which is diverted and caught in the gutter 284. It is important to note that the inventive system applies the high voltage to the entire stream or spray in aggregate. There is no effort to control the potential on individual droplets. This makes the control system much simpler and the printing much more reliable. Accordingly, a computer may apply signals simulated by switches 307, 311 to modulate the ink jet stream of droplets 220, 310, and thereby write or not write on paper 306.

When the ink supply is shut off, a drop of ink may grow at the tip of the jet nozzle, which will cause problems if uncorrected. First, the drop will tend to lessen the spacing between electrodes 254, 276, for example. Then, the printer head may have to be shut down and cleaned. A second problem is that the drop increases the inertia of the oscillating system. Therefore, the system would have some new printing characteristics.

To remove any drop from the end of the jet nozzle, a block of porous material 325 (FIG. 13A) is situated close to the nozzle. An outjutting part 327 of block 325 is positioned near the end of an arc R over which the jet nozzle swings during printing. The side wall S of the part 327 lies close enough to the nozzle to touch any drop forming thereon, but far enough so as not to touch the nozzle itself. Immediately upon its formation, the drop, if any, formed on the end of nozzle 218 is sucked into this porous material 325. Since the drop radius should not be larger than 200 $\mu$m, the distance Q in FIG. 13A is in the order of 250 $\mu$m, somewhat depending upon the positioning of the galvanometer relative to gravity. Also, the control circuit may be adjusted to produce moments acting on magnet 224 in order to either shake the nozzle or to bring it closer of block 325 responsive to drop formation. If so, there will be a capillary action between the drop on the jet nozzle and the porous block 325, in addition to a vacuumized cavity behind the block.

INK MANAGEMENT SYSTEM

The ink is supplied, under pressure, to the jet nozzle in each galvanometer, via its individually associated tubing 324 (FIGS. 9, 10). The system for pressurizing and transporting the ink is seen in FIG. 14. In greater detail, the ink pressure is supplied from either of two pressurized nitrogen bottles 58A, 58B through a pressure sensor 323A, a check valve 321, a valve 328, a regulator 326, and a sensor 323B to an on/off valve 330 in the vacuum line and in parallel therewith to a pressure tank 346. The pressure sensing device 323A senses when the nitrogen tank 58A (for example) is exhausted. Responsive thereto a sign 98 (FIG. 3) is lit on the control panel and the pressure system is switched over to the second nitrogen bottle 58B. A light 331 (FIG. 3) remains lit on the control panel to identify the exhausted nitrogen bottle, until it is replaced by a freshly charged one.

A vacuum is supplied over a path traced from a muffler outlet 322 (FIG. 1), through a motor-driven vacuum pump 334, a vacuum output 338 and a filter 336 to a vacuum accumulator bottle 340. From there, a vacuum line 342 (FIG. 14) runs by a ball valve 330A which is between the line and atmospheric pressure and to the on/off switching valve 330B. Therefore, line 344 may be either pressurized or held at a vacuum, depending upon the position of the switching valve 330.

The output line 344 of the switching valve 330 is connected to the inlet of a pressure tank 346 via a sliding valve 347 which either seats on "O" ring 349 or hangs down in an open position. The valve 347 seats against the "O" ring when pushed upwardly by a plastic bag 356. This valve mechanically keeps the bag from being sucked into the vacuum line 344.

The outlet 348 of pressure tank 346 is connected to a stand pipe 350 rising inside the pressure tank 346 and terminated by a tube 352. A floating ball valve 354 is entrapped within the tube 352. An "O" ring 357 is positioned under ball 354 to seal it against tube 352. Surrounding and sealed to the stand pipe 350 is a plastic bladder or bag 356 which may be filled with and emptied of ink. This bag 356 keeps the ink separate from both the pressurizing and vacuum systems in order to prevent contamination of the ink with foreign particles. Also, if any contamination should occur, it is a simple matter to change the bag. When the level of ink in bag 356 is higher than the end of the stand pipe 350, ball 354 floats within tube 352 and the ink may run out line 348. However, when the ink falls to approximately the level at the end of stand pipe 350, the ball valve 354 is pressed down by the bag and seats itself upon "O" ring 357 and ink may no longer run from outlet 348.

The user buys ink in a plastic cartridge 360 which is placed over a piercing receptacle 362 that makes a hole in the bag. Preferably, cartridge 360 is placed at a location which is higher than tank 346. A suitable collar 364 seals the cartridge 360 to the recepticle 362 so that the ink does not leak out the connection. A pressure sensor 366 detects the pressure in line 363 and gives a signal responsive to decreasing pressure (down to vacuum), when the ink is exhausted and the flow terminates. The signal is a lit sign at 98 (FIG. 3) and any other suitable alarm such as a buzzer sound. A check valve 368 prevents ink flow back into the cartridge 360 when tank 346 is pressurized. Line 372 leads to each of the galvanometer nozzles. In line 372, a pressure sensing device 374 detects low ink and gives a suitable signal on the lit signs 98 of FIG. 3.

The ink management and supply system operates this way. The on/off switching valve 330 is set to connect vacuum pump 60 to pressure tank inlet 344. The vacuum pump 60 creates negative pressure inside tank 346, which opens check valve 368, to draw ink from cartridge 360 into the plastic bag 356.

When the pressure tank bag 356 is filled with ink, valve 347 is pushed shut and on/off valve 330B disconnects the vacuum pump 60. The check valve 368 effectively terminates flow from the ink cartridge 360 and substitutes therefor the pressurized ink line 372 leading to the jet nozzles on the galvanometers of FIG. 10. The pressure of the nitrogen gas from one of the tanks 58 enters tank 346 via valve 347 and squeezes the plastic bag 356, thereby forcing ink out the line 372 to the jet nozzles of the galvanometers. When the ink supply in bag 356 is exhausted, floating ball valve 354 seats on stand pipe 350. Pressure sensor 374 responds to the resulting drop in line 372 pressure and causes the on/off valve 330B to switch and repeat the fill cycle.

The construction of ink cartridge 360 is seen in FIGS. 15–19. Initially, the cartridge begins as a die cut sheet **360*a* (FIG. 15) of plastic, twice as long as the final ink cartridge. An upstanding collar 364 is welded to one side of this plastic sheet. A small square flap 378 of similar material is placed over the other side of the plastic sheet blank 360*a*, opposite the collar 364. One edge 380 of flap 378 is welded to blank 360*a***.

Figure 16:
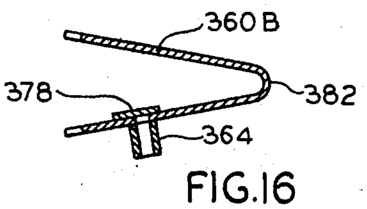
Figure 18:
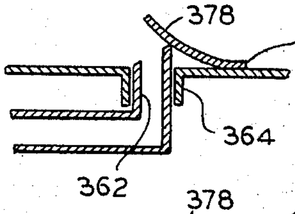
Figure 17:
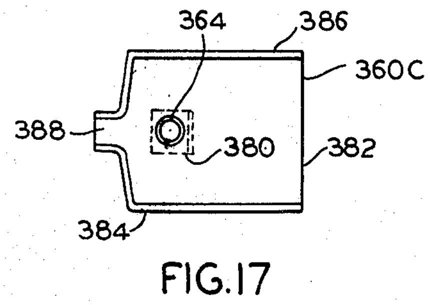
Figure 19:
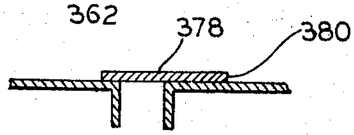

Next, blank **360*a* is folded along its center line 382, to take on the configuration 360*b* (FIG. 16). Then, the periphery of the blank 360*c* is welded every place 384, 386 (FIG. 17) except at fold 382 and neck 388. This forms a completed flask-shaped cartridge with an open neck at 388. A full charge or supply of ink is inserted through neck 388 and into the flask-shaped cartridge, by any suitable means. Then, the neck 388** is welded shut.

When the ink cartridge is used, the collar 364 is pressed over the piercing recepticle 362 (FIG. 18) which forms a hole in the cartridge wall. The internal flap 378 raises and ink may be drawn from the cartridge through the recepticle 362. After the ink supply is exhausted, the cartridge is removed from a recepticle, the flap member 378 closes (FIG. 19) over the pierced hole and acts as a flap valve to restrain further outward flow of ink.

ELECTRONIC CONTROL CIRCUIT

The computer-driven electronic circuit for controlling the ink jet printer is seen in FIG. 20. The principal parts of this circuit are a repertoire data storage mechanism 400, a microprocessor 402, a character generator 404, output buffer memories 406 individually associated with each galvanometer, and a clock pulse generator 408.

Clock pulses for controlling the electronic circuit are seen at 410. The alphanumerical character-forming matrix is seen at 411, and the printed labels are represented at 412. The cyclically repetitive or mechanically oscillated path followed by the ink jet nozzle is represented at 413 and the modulated ink deposited on paper 306 is shown at 415.

A sine wave at 415 is useful for explaining how data is processed during the downswing and ink is deposited during the upswing of the jet nozzle oscillations. The sine wave shaped path traced by oscillation of the ink jet nozzle is indicated at 415 in order to show the principle of the modulated ink jet. Mechanically, it is easiest to implement this sine wave path, but it has certain disadvantages. When a sine wave is used, the writing speed of the ink jet on the paper varies as the cosine of the deflection angle. Therefore, a constant length pulse on the modulation electrode generates a bar on the paper, the length of which is a function of the deflection angle of the jet nozzle. Of course, this non-uniformity of printing time could be circumvented by controlling the duration of information transmission to the modulation electrode.

If the nozzle oscillation follows a triangular wave pattern, a clock signal with a constant frequency could be used. However, such a wave pattern demands an excessive bandwidth and there is a phase change between the clock signal and the mechanical oscillation.

The writing speed of the ink jet should be low to optimize the resolution and density of the print out. Thus, a sawtooth-shaped oscillation pattern is suitable, since it has the lowest possible writing speed for a fixed frequency. However, the sawtooth scan requires a larger bandwidth for the mechanical oscillation system.

Thus, the shape of the scan has to be a compromise, depending on the application.

The repertoire of data is stored in device 400 (here called a "tape deck"), which may take any suitable form, such as: perforated cards or tapes, magnetic tapes, magnetic typewriter cards, or the like. In one embodiment, it is magnetic tape. This medium stores a repertoire of data which may be changed, up-dated, increased or deleted, in whole or in part. In the present example, each complete set of data in the repertoire includes a subscriber's name, address, and subscription number, which may be printed on up to five separate lines. In addition, the data may also include machine readable bar codes or mail sorting symbols.

The tape deck reader may be any well-known device for reading the storage media (e.g., a magnetic tape reading head) and it need not be described here.

The internal coding used for recording on the tape deck depends entirely upon the nature of the storage media and repertoire storage device 400. For example, one manufacturer of magnetic typewriters uses its own code. Other manufacturers use other codes. Therefore, the inventive ink jet printer controls include any suitable number of code converters 418, 420 which are able to accept and decode the data read from the repertoire storage. These code converters could be mounted on alternatively used printed circuit cards, which may be substituted for each other. Or, they could be alternative circuits selected by one of the control panel switches in FIG. 3. In any event, the data read out of the repertoire storage device at 400 is converted at 418, 420 into the well-known ASCII code. In one embodiment, the tape buffer memory 422 is adapted to store a block of data relating to six labels, each time that the repertoire memory 400 reads out.

The microprocessor 402 may be any of the well-known microprocessors which are currently available on the open commercial market. In an embodiment actually built and tested, an Intel 8080 microprocessor was used.

A suitable divide-by-nine circuit 421 is a galvanometer drive circuit which responds to a stream 425 of clock pulses from clock generator 408. The divide-by-nine circuit causes the ink jet 218 to mechanically oscillate backward and forward, and thereby trace a sine wave path 424 (also shown at 413) relative to a moving strip of paper 306. The output of the divide-by-nine circuit, which drives the nozzles, is shown at 417.

The instantaneous potentials applied to the electrodes 309, 256 either deflect the ink jet off the paper (jet stream charged) to not print or enable it to reach the paper (jet stream not charged) in order to print, thereby forming traces of ink (as at 426) or spots of ink (as at 428). By inspection, it should be apparent that the stream of ink droplets have been shown at 415 as having been deflected to print the letter "A" upon the paper 306, while the jet nozzle oscillates and the paper runs under the nozzle. This letter "A" is printed responsive to the character formed in the matrix 411.

Upon reflection, it should be apparent that the torsion in the twisting glass tube 214 causes the nozzle excursion to begin, speed up, slow, stop, reverse direction, begin again, speed up, slow, . . ., etc. Therefore, near each sine wave crest (at 429, for example) of the nozzle excursion, the jet is traveling much slower than it travels at the mid-swing (at 431, for example). Accordingly, the microprocessor 402 must modify its print commands to account for the location of the nozzle in its excursion (i.e., for the instantaneous excursion speed).

The characters are formed in circuit 404, which includes a 5 × 7 matrix, as shown at 411. Successive instantaneous incremental positions in each upswing in the sine wave of the nozzle excursions are represented by rows, at "1, 2, 3, . . . 9". These are the optional printing points. To account for the slower nozzle excursion speed at the crest (e.g., 429) near the ends of the excursions, the first and last matrix rows are duplicated. Thus, rows 1, 2 form the same optional printing point at a sine wave crest at one end of the jet nozzle excursion. Rows 8, 9 form the same optional printing points at a sine wave crest near the opposite end of the jet nozzle excursions. This way, during time intervals 1, 2 and 8, 9 ink flows to the paper twice as long, as it flows during time intervals 3–7, when the mid-swing jet nozzle is traveling faster, as at 431, for example.

Successive upswings in the sine wave 424 representing the jet nozzle excursions correspond to the columns 1–5 in matrix 411 (FIG. 20). Therefore, the jet nozzle is controlled to deposit ink at those incremental points in its successive upswing excursion (as indicated at 419) which correspond to the markings in columns 1–5 in matrix 411. Other alphanumerical characters are formed in the same way.

Each time that the repertoire memory 400 reads out a block of data, buffer memory 422 stores the data required to form up to 1000-characters, which is adequate for printing up to six labels. This buffer stored data is thereafter read out, a label at a time and transferred from circuit 422 to the microprocessor 402, which is adapted to store up to 256-characters (i.e., enough characters for one label).

The microprocessor 402 operates under a program stored at 423 to apply data to character generator 404 where the row and column format is established, as shown at matrix 411. In addition, clock generator 408 supplies a steady stream 425 of the clock pulses to the microprocessor 402 and to shift registers 406, which are individually associated with the five jet nozzles, two of which are shown at 427A, 427B. The character generator 404 supplies the data in a single matrix column, associated with a first line of printing to shift register 432, during a first clock pulse. During the next clock pulse, the data in shift register 432 is shifted to shift register 433 and data relating to a single matrix column in the next line of printing is stored at 432. In a similar manner, data representing each matrix column and relating to each line of printing is also stored in each of the individually associated shaft registers at 406. This data storage process is under control of a line selection circuit 437.

The operation of the electronic control circuit is best explained by the curves shown on FIG. 20. In greater detail, the clock pulse generator 408 applies a steady stream 425 of clock pulses to microprocessor 402, to shift registers 406, and to the galvanometer adjust and drive circuit 421. The first nine pulses 502 cause a jet nozzle 427B (for example) upswing because drive circuit 421 applies an output 417 of one polarity to the galvanometer coil 504 associated with the nozzle 427B.

During the next nine pulses 506, the jet nozzle 427B has a down swing because circuit 421 applies an output 508 of opposite polarity to coil 504. The resulting mechanical nozzle excursions are shown by curve 419.

A block of data is called up from the repertoire memory 400, six labels at a time, and stored in buffer memory 422. Thereafter, this same data is transferred one label at a time from the tape buffer memory 422 into a label memory 510 associated with the microprocessor 402. As indicated at 512, the microprocessor then applies the data in label memory 510 to the character generator 404 during the downswing period 506 of the jet nozzle.

At 514, there are five small shaded squares which indicate that the microprocessor 402 has transferred one label block of data required to print five lines from memory 510 through character generator 404 to shift registers 406. The data represented by shaded square "1" is stored in shift register 432 (for example) and the data represented by shaded square "5" is stored in shift register 436. In a similar manner, data represented by shaded squares "2"–"4" is stored in shift registers 433–435. The data storage occurred under control of clock pulses 516, during the downswing portion 506 of the jet nozzle excursion.

During the next following upswing 520 of the jet nozzle mechanical excursion, each jet prints out a line of printing responsive to the data stored in its associated shift register 406. Thus, for example, nozzle 427A prints out one line responsive to data stored in shift register 432, and nozzle 427B prints out another line responsive to data stored in shift register 436. Three other jet nozzles (not shown in FIG. 20) print out three other individual lines responsive to data stored in shift registers 433–435.

From FIG. 10, it will be recalled that the galvanometers 244–252 for printing odd and even lines are staggered, with respect to each other. Therefore, the paper 306 passing under the printing head encounters the ink jets from the galvanometers printing even lines before it encounters the ink jets from the galvanometers print odd lines. Accordingly, the drawing shows at 522 that the galvanometers of the jet nozzles associated with the even lines are driven by clock pulse "9" at a time when the jet nozzles associated with the odd lines are being driven by clock pulse "1". This "9" clock pulse delay coincides with the time required for the paper 306 to travel from the position of the even jet streams to that of the odd jet streams. As shown at 524, by way of example, the even line ink jets are printing the sixteenth characters in their lines while the odd line ink jets are printing the eighth characters in their lines. Thus, the individual lines of print are physically aligned even though the jet nozzles are physically staggered.

Lines 526 illustrate manipulation of the data and the operation of tape control circuit 528. Before the start of these lines 526, it is assumed that a block of data for printing six labels has just been transferred from the repertoire storage of tape deck 400 to the tape buffer 422. At time 530, the microprocessor 402 strobes OR gate 531 and orders the tape buffer 422 to fetch the data required to print the first label, which fetched data is stored in label memory 510. At time 532, the fetched data is withdrawn from label memory 510 and used to print one label. As soon as that first label is printed (at time 534), the microprocessor 402 again strobes OR gate 531 and orders the tape buffer 422 to fetch the data required to print the second label.

After the microprocessor 402 orders and the tape buffer 422 completes the fetching of all the stored data to print the sixth label (at time 536), the microprocessor 402 causes tape control circuit 528 to enable the tape deck 400, with a control signal. The tape deck 400 reads out the amount of data required to print six labels. Each time that the tape deck 400 reads out the data representing a single character, it strobes the OR gate 531, and the tape buffer 422 stores it.

When the tape deck 400 completes the transfer of data required to print six labels, it recognizes an end of block signal (at time 538). Thereupon, it changes a characteristic of its strobe signal, which the tape control circuit 528 recognizes. Responsive thereto, the tape control circuit 528 removes its enabling control signal from the tape deck 400, which stops sending. The tape control circuit 528 signals microprocessor 402 to indicate that it may proceed to command a printout of the first label. Thereupon, at time 540, the microprocessor orders the tape buffer 422 to fetch the information required to print the first label, which is done at time 542.

The nature of the printed labels should become apparent from a study of FIG. 21. Five jet nozzles 572, 576, 218, 576, 578 of the five galvanometers 244, 246, 248, 250, 252 (FIG. 10), respectively, are positioned over five separate ones of the lines of print 580–588 to be printed upon the label. Thus, each nozzle individually prints a separate line of print. The label being printed is seen at 590. A label which has been completely printed is seen at 592.

Advantage may be taken of the ink jet's ability to print graphic symbols as well as the more conventional alphanumerical symbols. For example, FIG. 21 includes a machine readable bar code 594 which individually identifies the particular label 592 to the microprocessor 402, or to another computer (not shown). Thus, for example, business return postcards may be printed with the labels, including the bar code 594. When customers return the postcards, they may be fed through automatic bar code reading machines. Responsive thereto, the reading computer is informed as to the identity of customers who are most likely to answer an advertisement. This way, the repertoire data storage device 400 may be controlled to read only those labels which have bar codes corresponding to the bar codes on postcards that have been returned. Thus, preferred data may be selectively called up from repertoire storage responsive to a machine readable code.

To achieve a maximum printing rate, a plurality of nozzles have been used, one for each line of print. However, this multiple nozzle usage has also led to a complex control system. Therefore, if a simplier control system is desired, and if speed of printing is not absolutely essential, trade-offs may be made. For example, FIG. 22 shows a path traced by a single jet as it sweeps over a plurality (six in this example) lines of printing. As the jet passes over each line of printing, it selectively deposits ink (or does not deposit ink) in order to make a plurality of lines of print. Thus, it is possible for any suitable number of nozzles to make any suitable number of lines of print.

Those who are skilled in the art will readily perceive various modifications which may be made without departing from the invention. Therefore, the appended claims are to be construed to cover all equivalents falling within the scope and the spirit of the invention.

We claim:

1. An ink jet printer comprising repertoire data storage means, means for repeatedly reading data out of said storage means, ink jet means responsive to each readout of said data for printing a plurality of characters, said ink jet means comprising means for mechanically oscillating a jet nozzle over a cyclically repetitive path, means for off/on modulating a stream from said ink jet simultaneously coordinated with said mechanical oscillations, a media pickup gate means for selecting and delivering one media at a time from a stacked plurality of media, vacuum means next to said gate means for sucking downwardly the bottom one of said stacked media, shuttle means supporting both said stacked media and said vacuum means for reciprocally moving the downwardly-sucked media toward and away from said gate means, the mechanical disposition of said gate means being such that said sucked down media passes under said gate means at one extremity of said shuttle movement, at least two guides on opposite sides of said stacked media, said guides being spaced slightly further apart than the width of said media, textured fibrous material lining said guides on sides thereof facing said media whereby said textured material fans said media as it settles between said guides, and means for successively transporting said plurality of media, one at a time, into the path, of said ink jet stream at a fixed speed relative to the oscillation cycle of said jet nozzle.

2. An ink jet printer comprising repertoire data storage means, means for repeatedly reading data out of said storage means, ink jet means responsive to each readout of said data for printing a plurality of characters, said ink jet means comprising means for mechanically oscillating a jet nozzle over a cyclically repetitive path, means for off/on modulating a stream from said ink jet simultaneously coordinated with said mechanical oscillations, a media pickup gate means for selecting and delivering one in a stacked plurality of media to said ink jet means, vacuum means next to said gate means for sucking downwardly the bottom one of said stacked media, shuttle means supporting both said stacked media and said vacuum means for reciprocally moving the downwardly sucked media toward and away from said gate means, the mechanical disposition of said gate means being such that said sucked down media passes under said gate means at one extremity of said shuttle movement, means for transporting said media from said gate through said printer and into the path of said ink jet stream at a fixed speed relative to the oscillation cycle of said jet nozzle, said transport means comprising two spaced pairs of vertically oriented nip rollers, the upper one of each pair of nip rollers being mounted on its own axle for independent vertical movement, whereby the two axles of said upper nip rollers may be either aligned or grossly misaligned responsive to said independent vertical movement so that one of said pairs of nip rollers may be wider spaced than the other pair of nip rollers in order to pass a thicker side of said media than the other of said pair of nip rollers may pass, and means for simultaneously driving both of the two axles of said upper nip rollers from only one side of said rollers without regard to either the alignment or misalignment of said two axles.

3. The ink jet printer of claim 2 and differential means interposed in said simultaneous driving means whereby the peripheries of said pairs of nip rollers may move at different linear speeds without skuffing a media passing between the nip rollers.

4. The ink jet printer of claim 2 wherein said two axles of said nip rollers are generally positioned in series, means for moving said axles perpendicular to their long axis, independently relative to each other, whereby said axles may be either coaxially or non-coaxially oriented relative to each other, three similarly shaped spaced parallel pentagonal planar plates having five apexes equally spaced around the periphery of said plates, a plurality of elongated arms pivotly connected at their opposite ends to corresponding apexes of opposing plates, eccentric means on one end of one of said axles attached to the center of an outside one of said three parallel plates, and means for attaching one end of the other of said axles to the center of the other outside one of said three parallel plates, each of said axles being perpendicular to the planes of said plates.

5. An ink jet printer comprising repertoire data storage means, means for repeatedly reading data out of said storage means, ink jet means responsive to each readout of said data for printing a plurality of characters, said ink jet means comprising means for mechanically oscillating a jet nozzle over a cyclically repetitive path, means for off/on modulating a stream from said ink jet simultaneously coordinated with said mechanical oscillations, means for transporting a media in the path of said ink jet stream at a fixed spaced relative to the oscillation cycle of said jet nozzle, ink management means comprising a pressure tank with an inlet and outlet and having therein a flexible bag sealed to the outlet, a source of pressurized fluid connectable to said inlet, vacuum means also connectable to said inlet, ink supply means connectable to said outlet, value means for selectively connecting said vacuum means to the inlet of said pressure tank and for simultaneously connecting said ink supply means through the outlet and into said flexible bag, whereby a vacuum formed between said tank and said bag sucks ink from said supply means into said bag, said valve means operating for selectively removing said vacuum from said inlet and said ink supply means from said outlet and for effectively connecting said pressurized fluid source to said inlet, whereby said flexible bag is squeezed to force said ink from said outlet.

6. The ink jet printer of claim 5 wherein said ink supply means comprises a sheet of plastic, folded in half, with a weld closing the open sides of said folded material, an upstanding collar welded to one side of said plastic sheet, a flap welded opposite said collar and to the other side of said sheet, and piercing tube means adapted to fit through and seal to said collar for piercing said plastic sheet in the area surrounded by said collar.

7. A media pickup gate for an ink jet printer comprising shuttle means having a table for supporting a stack of media and for enabling said media to be moved with reciprocal movement toward and away from said gate, means for stacking on said shuttle a plurality of media in a vertically aligned orientation, at least two guides on opposite sides of said stacked media, said guides being spaced a distance apart which is substantially equal to the width of said media, textured fibrous material lining said guides on sides thereof facing said media whereby said textured material fans said media as it settles between said guides, means near the bottom of said stacking means for pulling said media one at a time from the bottom of the stack, said last-named means comprising vacuum means formed in the bottom of a depression on said shuttle means next to said gate for sucking downwardly the bottom one of said stacked media, said depression passing under said gate at one extremity of said reciprocal movement, means for vertically adjusting said gate to a height which enables only the bottom one of said media to pass under said gate when said bottom media is sucked down into said depression while said shuttle is passing under said gate at the extremity of said movement, means for selectively delivering a plurality of prestored sets of data to drive said ink jet printer to print one set of data on each media, and means for transporting the media which passes under said gate through said ink jet printer at speeds and with spacing coordinated with the delivery of said sets of data.

8. The media pick up gate of claim 7 wherein said textured fiberous material ends a predetermined height above the table of the shuttle.

9. A media pickup gate for an ink jet printer comprising shuttle means having a table for supporting a stack of media and for enabling said media to be moved with reciprocal movement toward and away from said gate, means for stacking on said shuttle a plurality of media in a vertically aligned orientation, means near the bottom of said stacking means for pulling said media one at a time from the bottom of the stack, said last-named means comprising vacuum means formed in the bottom of a depression on said shuttle means next to said gate for sucking downwardly the bottom one of said stacked media, said depression passing under said gate at one extremity of said reciprocal movement, means for vertically adjusting said gate to a height which enables only the bottom one of said media to pass under said gate when said bottom media is sucked down into said depression while said shuttle is passing under said gate at the extremity of said movement, means for transporting the media which passes under said gate through said ink jet printer, two spaced pairs of vertically oriented nip rollers, the upper one of each pair of nip rollers being mounted on its own axle for independent vertical movement, whereby the two axles of said upper nip rollers may be either aligned or grossly misaligned responsive to said independent vertical movement so that one of said pairs of nip rollers may be wider spaced than the other pair of nip rollers in order to pass a thicker side of said media than the other of said pair of nip rollers may pass, means for simultaneously driving in series the axles of both of said upper nip rollers from only one side of said rollers and without regard to either the alignment or the misalignment of said axles, and differential means interposed in said driving means whereby the peripheries of said pairs of nip rollers may be driven at different linear speeds without scuffing a media passing between the two opposed pairs of nip rollers.

10. The media pick up means of claim 9 wherein said driving means comprises a Bowden cable connected between said differential and the axle of the nip rollers on said one side.

11. The media pick up means of claim 9 and rotary motion transmission means coupled between the axles of said upper ones of said nip rollers, said transmission coupling means comprising three similarly shaped, spaced parallel, multi-sided planar plates, said multisides forming a periphery for each plate having a plurality of apexes equally spaced around the periphery thereof, a plurality of elongated arms for pivotly interconnecting corresponding apexes of adjacent plates, eccentric means on one end of one of said upper nip roller axles attached to the center of an outside one of said three plates, and means for attaching one end of the other of said nip roller axles to the center of the other outside one of said three plates, each of said axles being perpendicular to the planes of said plates when so attached thereto.

12. The media pick up means of claim 11 and repertoire data storage means, a bulk data storage medium which may be changed, updated, increased or decreased, or deleted in whole or in part, for controlling information printed upon said media, microprocessor means for directing a ganged multiplicity of ink jet printing means to simultaneously print said information in a plurality of lines at a time, said ink jet printing means comprising means at the outlet of said nip rollers for picking up and feeding the media under the ganged ink jet means, and means also responsive to said microprocessor for performing a number of housekeeping functions simultaneously with said printout to insure delivery of an adequate supply of ink to and collection of spent ink from the ganged ink jet means.

13. The media pick up means of claim 12 wherein said ink supply is delivered from means comprising a sheet of plastic, folded in half, with a weld closing the open sides of said folded plastic sheet, an upstanding collar welded to one side of said plastic sheet, a flap welded opposite said collar and to the other side of said sheet, and piercing tube means adapted to fit through and seal against the interior of said collar for piercing said plastic sheet in the area surrounded by said collar.

14. The media pick up means of claim 12 wherein said ink delivery system comprises a pressure tank having an inlet and an outlet with a flexible bag enclosed within said tank and sealed to the outlet, a source of pressurized gas attached to said inlet via a switching valve, a source of vacuum also attached to said inlet via said switching valve, ink supply means attached to said outlet via a second switching valve, and valve control means for selectively connecting said vacuum source to the inlet of said pressure tank and for simultaneously connecting said ink supply means through the outlet and into said flexible bag, whereby a vacuum is formed between said tank and said bag to suck ink from said supply means and into said bag, said valve means operating for selectively operating removing said valve control means to disconnect said vacuum source means and said ink supply means and to effectively connect said pressurized gas source to said inlet, whereby said flexible bag is squeezed to force said ink from said outlet.

15. A system for mounting and turning at least two longitudinally spaced rollers mounted on separate axles having independently variable vertical movement so that the axle of one of said rollers may be either aligned or grossly misaligned with the axle of the other of said rollers, means for simultaneously driving the axles of both rollers from only one side of one of said rollers and without regard to the alignment or misalignment of said separate axles, said last named including three similarly shaped spaced parallel planar plates, having peripheries with a plurality apexes equally spaced around the periphery, a plurality of elongated arms pivotly connected at their opposite ends between corresponding apexes of adjacent plates, eccentric means on one end of one of said axles attached to the center of an outside one of said three plates, and means for attaching one end of the other of said axles to the center of the other outside one of said three plates, each of said axles being perpendicular to the planes of said plates.

16. The system of claim 15 and Bowden cable means connected between a source of driving power and the axle on said one side of said one roller.

17. The system of claim 16 and differential means interposed between said driving source means and the axle on said one side of said one roller whereby the peripheries of said rollers bear against other rollers driven at different linear speeds without skuffing a media which may pass between them.

18. The system of claim 17 wherein said rollers and said other rollers form nip rollers for delivering media to a printing head, and transport means comprising at least one endless belt at the outputs of said nip rollers and extending under said printing head, said driving source means being coupled to drive said endless belts at one end thereof and said differential being coupled between the other end of said endless belt and said Bowden cable.

19. An ink management system for a printing machine, said system comprising a pressure tank with an inlet and an outlet, a flexible bag inside said pressure tank and sealed around the outlet, a source of pressurized gas, a source of vacuum, ink supply means, and a gas line containing valve means for selectively connecting said vacuum source to the inlet of said pressure tank and for simultaneously connecting said ink supply means through the pressure tank outlet and into said flexible bag, whereby a vacuum is formed between said tank and said bag to suck ink from said supply means through said outlet and into said bag, said valve means operating for selectively removing said vacuum source and ink supply means from said pressure tank and to effectively connect said pressurized gas source to said inlet, whereby said flexible bag is squeezed to force said ink from said outlet under pressure.

20. The ink management system of claim 19 wherein there are two of said sources of pressurized gas and means responsive to exhaustion of one of said pressure sources for automatically switching to the other of said two pressure sources.

21. The ink management system of claim 19 wherein said ink supply means comprises a sheet of plastic, folded in half, with a weld closing the open sides of said folded material, an upstanding collar welded to one side of said plastic sheet, a flap welded opposite said collar and to the other side of said of said sheet, and piercing tube means connected through said gas line to said pressure tank outlet, said piercing tube means being adapted to fit through and seal to said collar for piercing said plastic sheet in the area surrounded by said collar.

22. The ink management system of claim 19 and a ganged multiplicity of ink jet means to simultaneously print out a plurality of lines at a time, transport means for picking up and feeding a media under the ganged ink jet means, and means for controlling said valve means simultaneously with said printout to insure delivery of an adequate supply of ink to and removal of a drop of ink from the ink jet.

23. The ink management system of claim 22 and spent ink collection means comprising a porous electrode having one side positioned near said ink jet means, and means for connecting said vacuum source to a side of said porous electrode opposite said one side.

24. The ink management system of claim 23 wherein said spent ink collection means further comprises a gutter having an upstanding knife edge positioned under said electrode, a porous block between said electrode and said knife edge and means for connecting said vacuum source to draw spent ink from said gutter through said porous block.

25. Means for automatically fanning stacked media for a printer comprising at least two vertical guides on opposite sides of said stacked media, said guides being spaced apart by a distance substantially equal to the width of said stacked media, and stationary textured fiberous material lining stationary said guides on sides thereof facing said media whereby said textured material fans said media as it settles under gravity between said guides.

26. The automatic fanning means of claim 25 wherein said textured fiberous material ends a predetermined height above the bottoms of said guides, whereby said media settles over said predetermined height without fanning.

* * * * *